United States Patent
Wu et al.

(10) Patent No.: US 7,086,272 B2
(45) Date of Patent: Aug. 8, 2006

(54) CALIBRATION METHOD FOR DIGITAL AIR PRESSURE GAUGE

(76) Inventors: Min Wu, 1219 Brandybuck Way, San Jose, CA (US) 92121; Shen-Chi Lin, 5 Fl., No. 28, Alley 3, Lane 246, HsinMing Road, Taipei (TW)

( * ) Notice: Subject to any disclaimer, the term of this patent is extended or adjusted under 35 U.S.C. 154(b) by 23 days.

(21) Appl. No.: 10/866,269

(22) Filed: Jun. 11, 2004

(65) Prior Publication Data

US 2005/0274166 A1    Dec. 15, 2005

(51) Int. Cl.
*G01L 27/02*    (2006.01)
*G01L 7/16*    (2006.01)
*G01L 17/00*    (2006.01)
*G01L 19/14*    (2006.01)

(52) U.S. Cl. .................. 73/1.63; 73/1.59; 73/1.61; 73/746; 73/753; 73/1.62; D10/85; D10/86

(58) Field of Classification Search ........ 73/1.57–1.59, 73/1.61–1.63, 1.71, 1.72, 700, 708, 744, 73/745, 746, 753, 754, 756; D10/85, 86
See application file for complete search history.

(56) References Cited

U.S. PATENT DOCUMENTS

| | | | | |
|---|---|---|---|---|
| 1,427,389 A | * | 8/1922 | Horne | 7/100 |
| 1,429,313 A | * | 9/1922 | Badowski | 138/89.4 |
| 4,586,382 A | * | 5/1986 | Sinha | 73/703 |
| 5,168,751 A | * | 12/1992 | Hwang | 73/146.8 |
| 5,710,370 A | * | 1/1998 | Shanahan et al. | 73/1.35 |
| 6,073,480 A | * | 6/2000 | Gokhfeld | 73/29.02 |
| D496,602 S | * | 9/2004 | Shipman | D10/86 |
| 2004/0020420 A1 | * | 2/2004 | Evans et al. | 116/34 R |
| 2005/0088321 A1 | * | 4/2005 | Weber | 340/988 |

OTHER PUBLICATIONS

Kester, Walt, "Practical Design Techniques for Sensor Signal Conditioning", 1999, Analog Devices, Inc., pp. 1.1-2.19.*

* cited by examiner

*Primary Examiner*—Hezron Williams
*Assistant Examiner*—David A. Rogers
(74) *Attorney, Agent, or Firm*—Robert O. Guillot; Intellectual Property Law Offices

(57) ABSTRACT

The digital air pressure gauge includes an error correction lookup table database stored within a memory device within the gauge. The database includes reference air pressure values and associated measured air pressure values, where the reference air pressure values and associated measured air pressure values are determined at identical discrete time intervals as pressurized air is input into the gauge. A transducer generates an electrical signal representative of air pressure within a device such as a pneumatic tire. A microprocessor compares the electrical signal with measured air pressure values within the database and determines a closest measured air pressure value. The microprocessor then determines the associated reference air pressure value of the closest measured air pressure value. The reference air pressure value is then displayed as the accurate pressure of the pressurized air within the device. The gauge may be disposed within a tire valve cap with an RF transmitter.

10 Claims, 8 Drawing Sheets

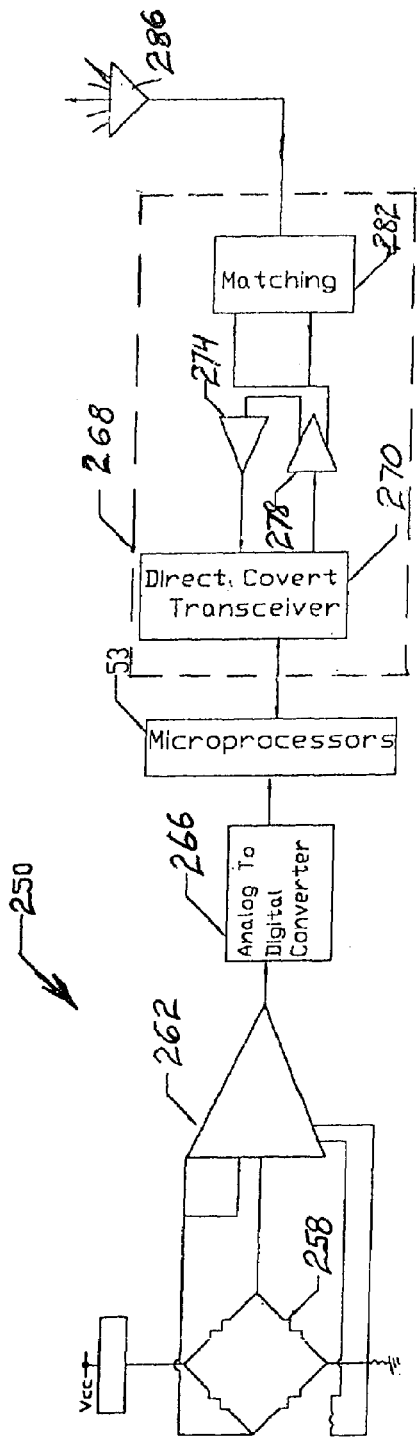
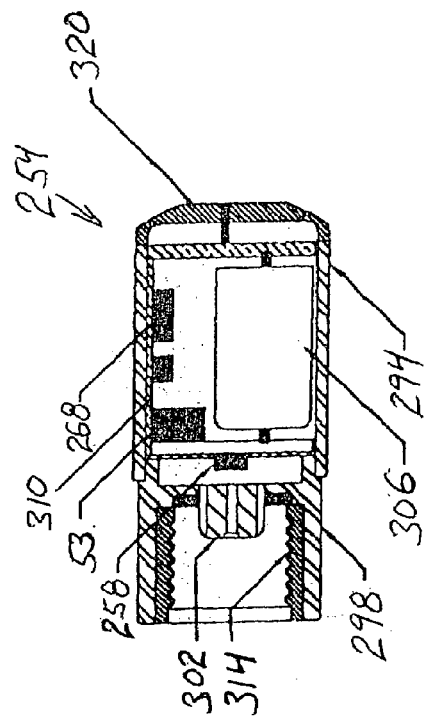
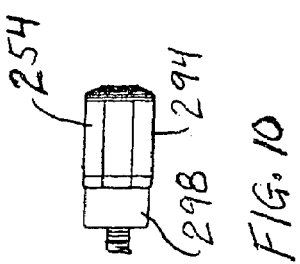
FIG. 9
FIG. 11
FIG. 10

CALIBRATION METHOD FOR DIGITAL AIR PRESSURE GAUGE

BACKGROUND OF THE INVENTION

1. Field of the Invention

The present invention relates generally to digital air pressure gauges and more particularly to calibration methods for digital tire pressure gauges.

2. Description of the Prior Art

A digital pressure gauge generally involves the application of a microprocessor and a pressure measurement device such as a pressure sensor or load-cell coupled with a potentiometer. The microprocessor reads data out of the pressure measurement device and stores the data. The microprocessor then carries out control functions as well as math and data storage from programming. The microprocessor automatically compensates for errors and then displays a digital signal on the liquid crystal display (LCD) or light-emitting diodes (LED).

The most important thing about a digital pressure gauge is its accuracy. In pressure gauge design the input and output relationship must be predetermined, as without a defined reference relationship the measured pressure cannot be displayed. Currently, the best way to predefine the reference relationship is by setting the input and output data in a linear relationship.

There are many types of errors of the measurement device that can affect the accuracy of the digital gauge. They include span error, linearity error, and a random type offset error. FIGS. 1a–1c demonstrate graphically these unpredicted errors found within a typical tire pressure gauge measurement device; specifically, span error (FIG. 1a), non-linearity error (FIG. 1b) and random offset error (FIG. 1c). In each of these FIGS. 1a–1c, the predefined reference straight line 12 for the system establishes the relationship between input and output. In FIG. 1a, the measurement span error 16 shows that the span error is linear and increases with increases of input pressure. In FIG. 1b, the measured non-linear error 20 is dependent on the curvature between the reference line 12 and measurement line 20, and in FIG. 1c the random offset error 24 is not repeatable. These errors may be caused by the tolerances of mechanical parts, material property characteristics, or assembly mistakes, etc, and they cannot be predicted in advance. As long as these errors exist in the digital gauge, the input data and measured data will not have the same linear relationship as is predefined, and because of these errors the gauge will display an inaccurate pressure reading, so compensating for these errors is essential.

In current prior art devices, calibration is typically performed by applying the status equilibrium method. This involves predetermining a few reference pressure points to divide the pressure range into intervals. Using the digital gauge against a very accurate test gauge, calibration of the beginning and ending reference pressure point of each interval is done. The measured reference pressure voltage is stored in memory. When subsequent pressures are measured, the stored reference voltage is obtained from the memory, thereby attempting to give the correct voltage and compensating for errors. A linear interpolation method is used to calculate the value of pressure between reference pressure points. The drawback of this technique occurs if the measured voltage and the referenced voltage are not in a linear relationship, then use of the linear interpolation method to calculate voltage between reference pressure points will be inaccurate. This calibration technique is time-consuming and of high cost, and if a large number of pressure points are needed to compensate the nonlinear or random offset errors then this technique is not acceptable.

SUMMARY OF THE INVENTION

The most difficult task in manufacturing a pressure gauge is the calibration for accuracy. The present invention is a digital tire pressure gauge and a technique directed to improve its calibration by use of a database derived from the voltage versus pressure inflation time history. During the gauge inflation the airflow is unsteady flow. The pressure varies with time, so the process of measuring a voltage versus pressure inflation time history at discrete time intervals can create the database for error compensation. A sampling of pressure input signals at discrete time intervals with very little effort can generate a series of measured voltages over the pressure range of interest. The results are then used to form a lookup table database which is stored into memory. By taking the reference pressure voltage at the same time intervals, the table has a series of measured voltages and reference pressure voltages. The voltages in each row of the lookup table have two (2) entries stored as a database to be used at later subsequent pressure measurements. At each subsequent measurement, the microprocessor reads signals from the measurement device then searches for the proper measured voltage in the lookup table database to match with that measured voltage. The microprocessor then uses the stored reference pressure voltage to replace the measured voltage for display, giving the correct values and compensating for any span, offset and linearity errors. Each digital gauge, by using the measured voltage at discrete time intervals from the voltage versus pressure inflation time history to create the lookup table database for error compensation, can have greatly improved gauge accuracy compared to what was available previously.

It is an advantage of the present invention that it provides a digital gauge that is easy to calibrate.

It is another advantage of the present invention that it provides a wireless tire pressure gauge that is easy to calibrate.

It is a further advantage of the present invention that it provides a digital pressure gauge that can be calibrated to a higher degree of accuracy than was available previously.

It is a further advantage of the present invention that it provides a wireless tire pressure gauge that can be calibrated to a higher degree of accuracy than was available previously.

It is yet another advantage of the present invention that it provides a manufacturing method for creating and calibrating a plurality of coil spring coupled with potentiometer digital pressure gauges, each of which is easily calibrated to provide accurate results.

It is still another advantage of the present invention that it provides a manufacturing method for creating and calibrating a plurality of valve cap type radio frequency transmitter wireless pressure gauges, each of which is easily calibrated to provide accurate results.

It is an advantage of valve cap type radio frequency transmitter to have the antenna built into the top of the cap to reduce attenuation and increase the transmission distance.

The foregoing and other objects' features and advantages of the present invention will be apparent from the following detailed descriptions of the preferred embodiments, which make reference to several drawings.

IN THE DRAWINGS

The following drawings are not made to scale as an actual device, and are provided for illustration of the invention described herein.

FIG. 9 is a block diagram of the operational features of an alternative valve cap type transmitter digital tire pressure gauge of the present invention;

FIG. 10 is an elevational view of a valve cap type digital tire pressure gauge of the present invention; and FIG. 11 is a cross-sectional view of the valve cap type digital tire pressure gauge of the present invention.

DETAILED DESCRIPTION OF THE PREFERRED EMBODIMENTS

Figure 1A:
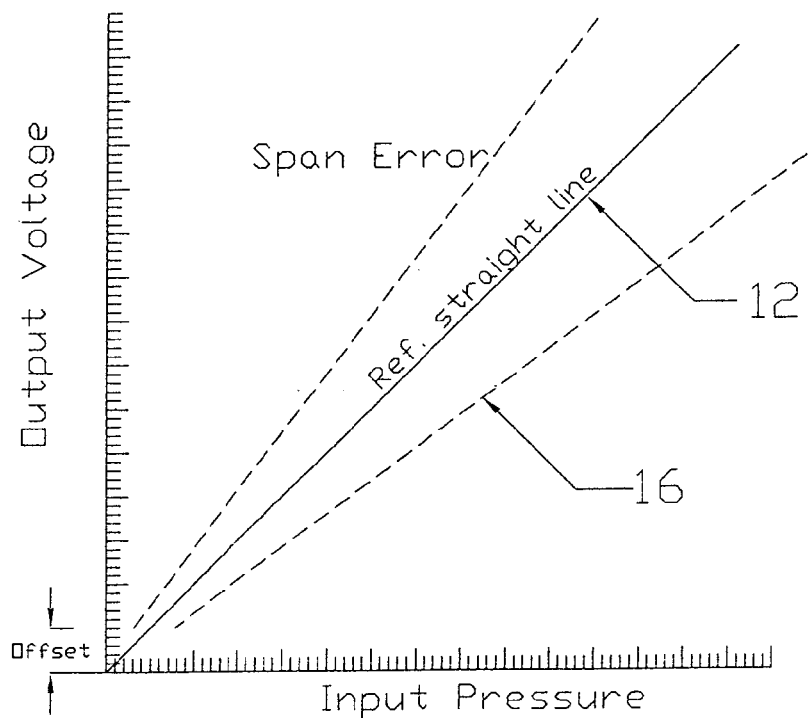
FIGS. 1a–1c depict tire pressure gauge errors demonstrated graphically.
Figure 1B:
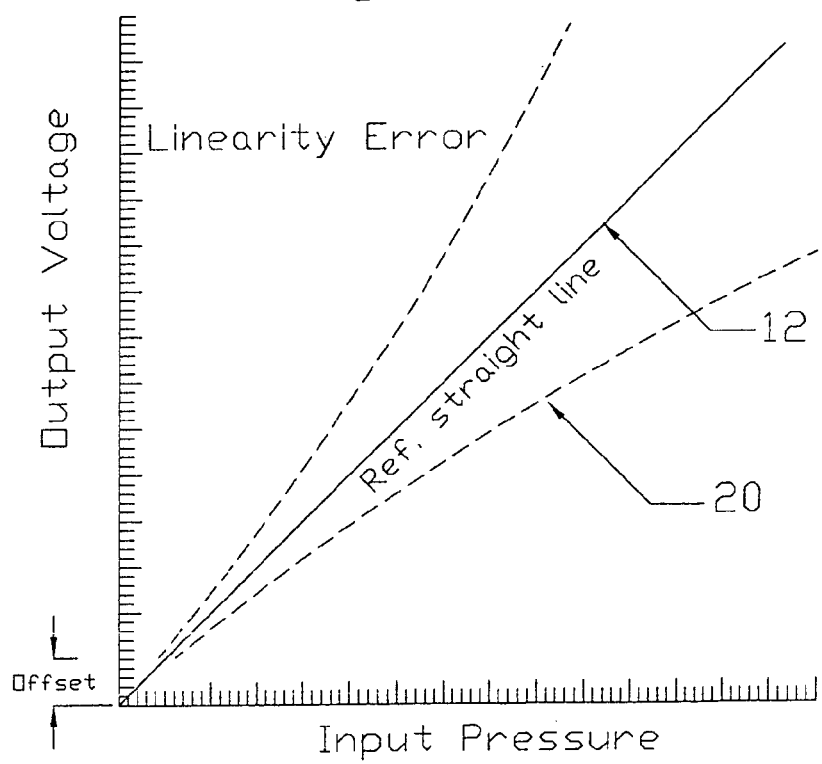
Figure 1C:
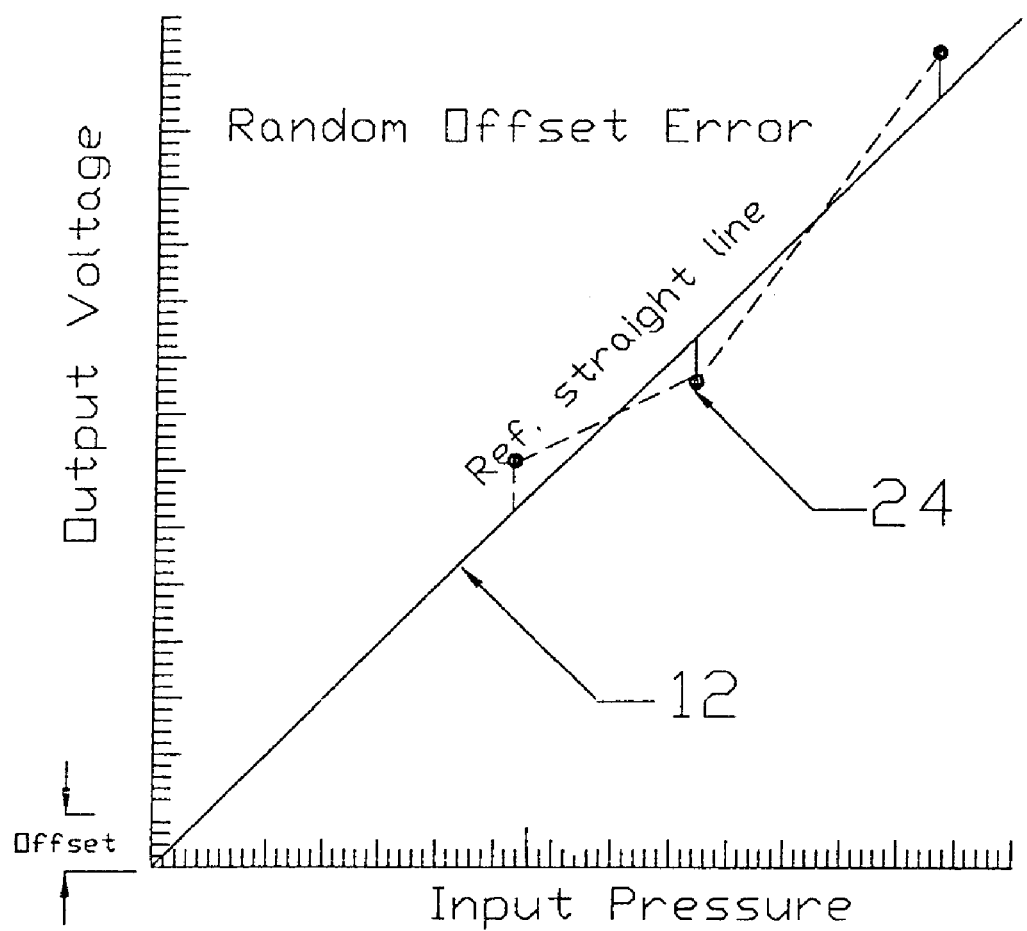
Figure 2:
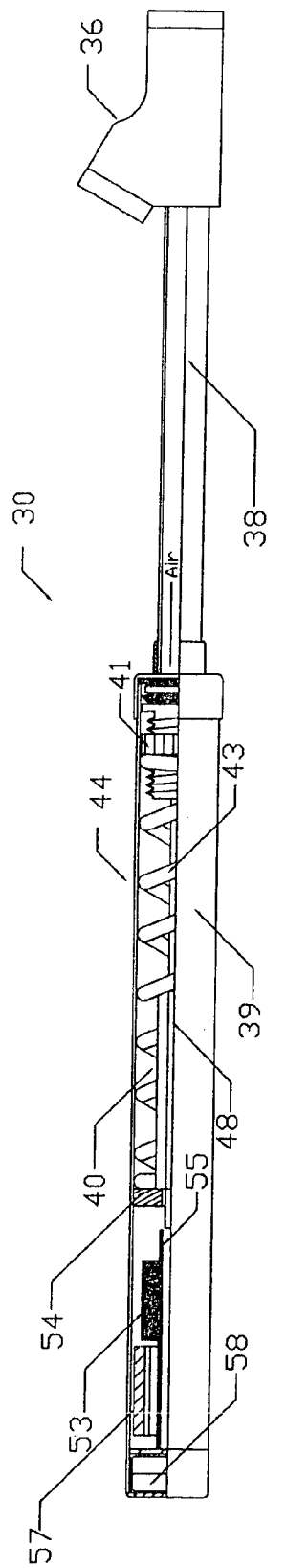
FIG. 2 is a plan view with cutaway portions of a first embodiment of the digital tire pressure gauge of the present invention.

Referring to FIG. 2, the digital tire pressure gauge 30 of the present invention may have a dual-foot pressure head 36 or a single pressure head (not shown), airflow tube 38 and a cylindrical gauge tube 39. The gauge 30 includes a pressure transducer 44, including a piston 41, a spring 43, and a linear potentiometer 40 that is mechanically connected to the spring by a movable contact or wiper 48, a circular spring support 54 with an opening for the wiper 48, a printed circuit board 55 including a microprocessor 53, a liquid crystal display 57, and battery 58, all of which are disposed within the cylindrical gauge tube 39.

Figure 3:
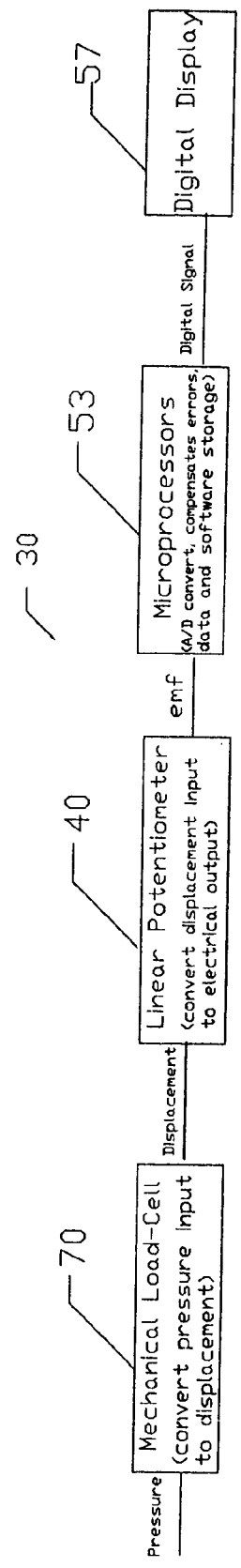
FIG. 3 is a block diagram depicting components of the signal processing system of the present invention.

FIG. 3 illustrates a block diagram for the digital tire gauge indicated by reference numeral 30. The system includes a mechanical load-cell 70 (which includes the piston 41 and spring 43) to convert pressure input to displacement. The displacement is then coupled to the linear potentiometer 40 through the movable contact or wiper 48, which converts the displacement to an electronic signal that is fed to a microprocessor 53 upon the printed circuit board 55. Microprocessor 53 reads the electronic signal and is programmed to carry out commands for compensating for measurement errors, database storage, as well as converting the analog signal to a digital signal for the digital display.

Figure 4:
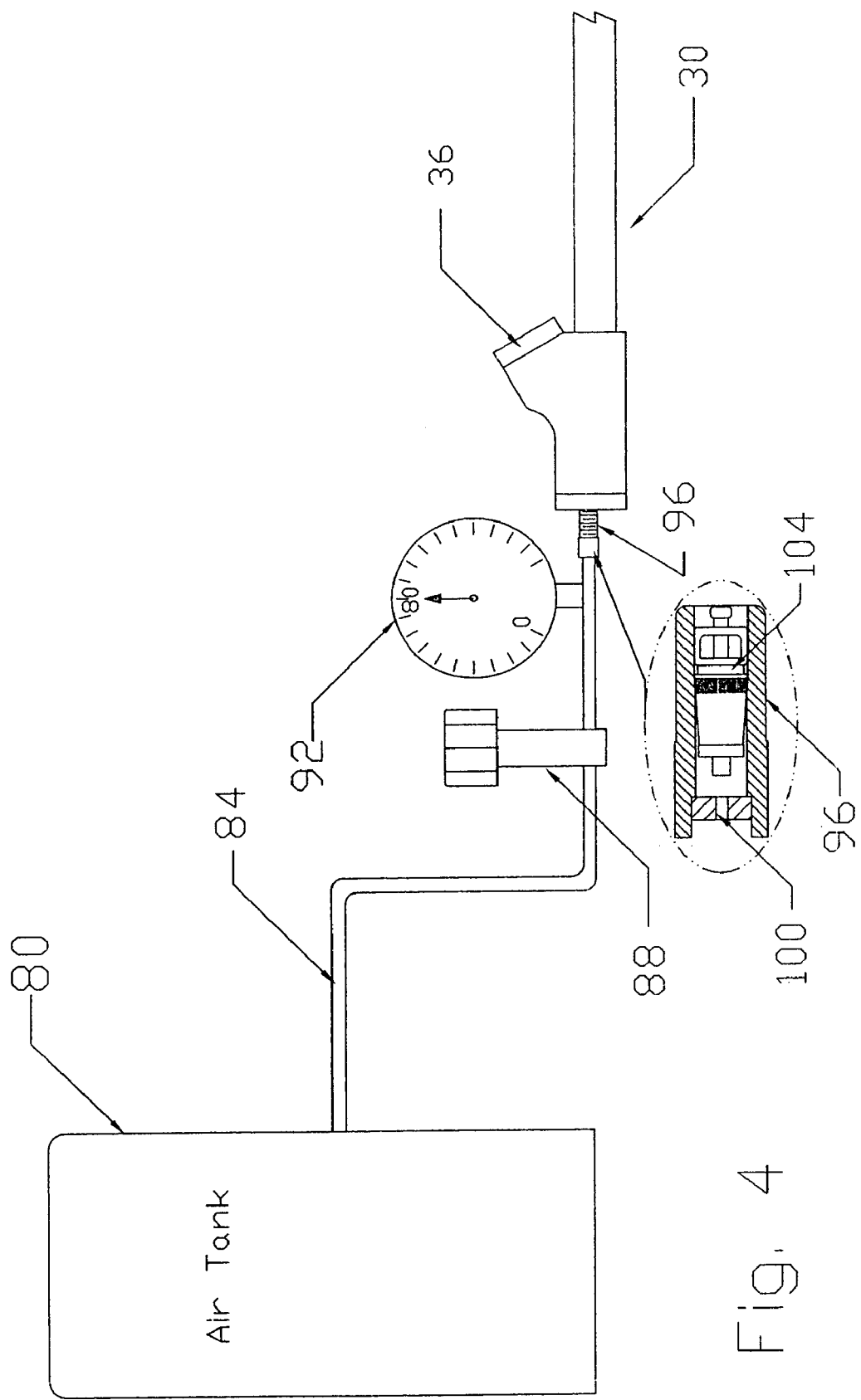
FIG. 4 is a diagram depicting equipment utilized during gauge calibration for error compensation.

The present invention includes a lookup table database that is used to compensate for measurement errors. This lookup table database is created subsequent to the assembly of the pressure gauge and is stored within the microprocessor for automatic error correction during usage of the pressure gauge. In the present invention, the lookup table database is preferably created by taking an inflation time history profile of the gauge, and FIG. 4 depicts the mechanical devices that may be used to create the inflation time history. As depicted therein the mechanical devices may include an air supply tank 80, air supply tube 84, pressure regulator 88, an accurate reference test gauge 92, and closed type valve stem nozzle 96. Inside the nozzle a short tube with small opening 100 and tire valve core 104 are placed. The air supply tank 80 provides the inflation air through the air supply tube 84 through the pressure regulator 88, which will provide constant pressure input for the system. As the digital gauge 30 pushes into the tire valve nozzle 96 and opens the valve core 104, air will inflate into the gauge head 36. The airflow inside the gauge is an unsteady flow, and the pressure value changes with inflation time t. For the purpose of controlling the duration of inflation time history, the small flow rate control tube 100 is preferably placed in front of valve core 104, such that the flow rate from the nozzle will be controlled by the size of the opening of 100. The unsteady flow inflation air will act on the piston 41 and the spring 43 that is integrated with the piston 42, and supported by the circular support having an opening 54. As the spring 43 is compressed by the pressure difference from the airflow, the deflection from spring 43 is coupled to the linear potentiometer 40 by the moveable contact or wiper 48, which then converts the spring displacement into an electronic signal that is transmitted to the printed circuit board 55 and microprocessor 53. The data is measured over the pressure range of interest, and the measured data is then stored into the memory associated with the microprocessor. The pressure and transducer output voltage are read by the microprocessor 53, and the microprocessor then carries out a command from the program to create a lookup table database that is later used to compensate for measurement errors. Thereafter, when the gauge is used, at each subsequent measurement, the output voltage from the transducer 44 is read by microprocessor 53 and put into memory. The microprocessor then carries out a command from the program to search for the closest measured voltage from the lookup table database, and forces the measured voltage to be replaced by the reference voltage. The reference voltage digital signal is then sent to the LCD display 57.

Figure 5:
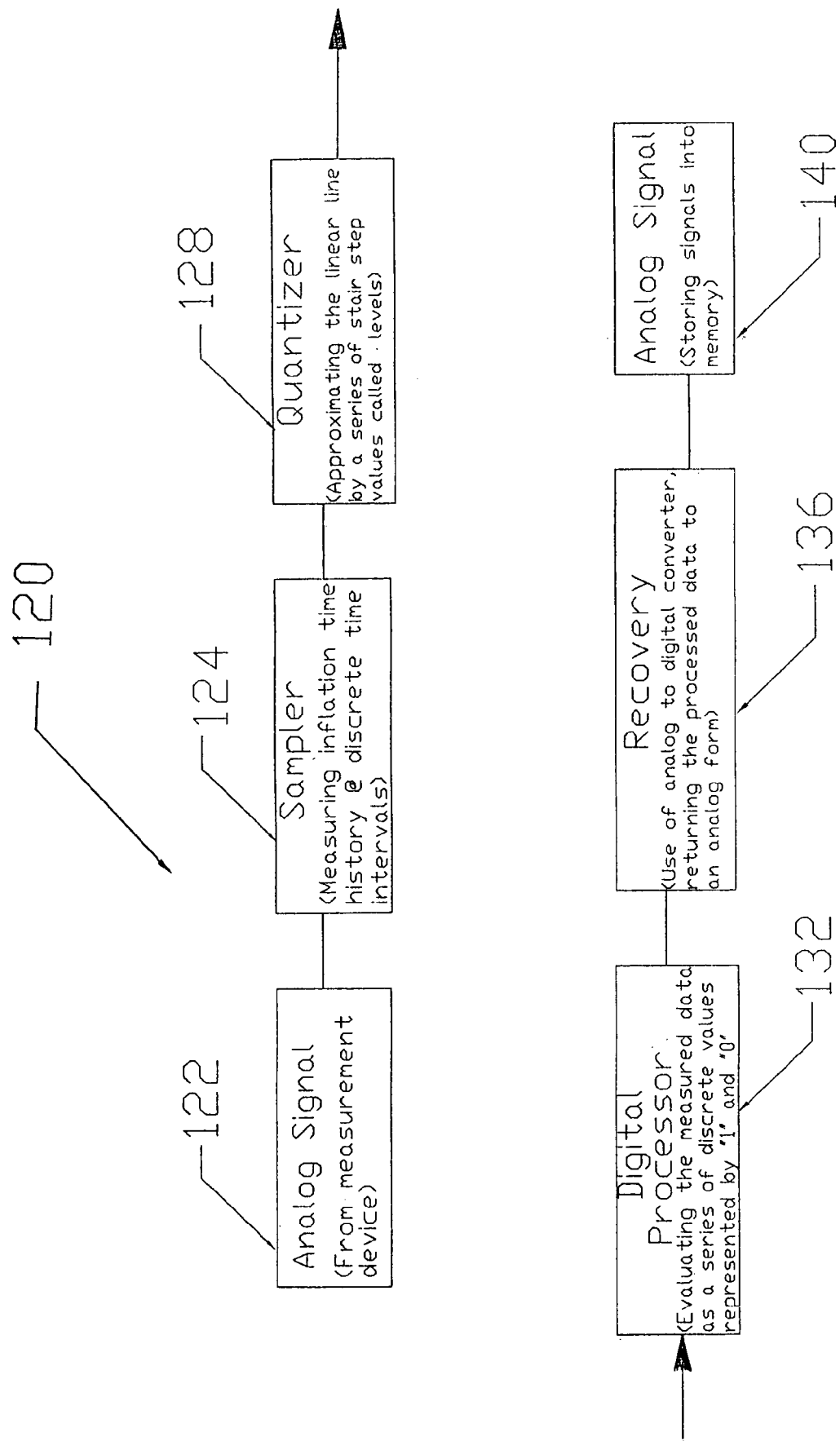
FIG. 5 is a block diagram illustrating the process of sampling the measured voltage during the gauge pressure inflation time history.

Referring now to FIG. 5, a block diagram reference 120, depicts the act of measuring a voltage versus pressure inflation time history during the calibration of the device, which denotes the data acquisition system for the measurement device. The system includes an analog signal 122 that is read from the potentiometer measurement device 40, a sampler 124 measuring the time history at discrete time intervals, a quantizer 128 for approximating the linear curve by a series of stair-step values called levels, a digital processor 132 for digital processing or evaluating the linear function as a series of discrete values represented by ones and zeros, a recovery 136 by the analog to digital converter for returning the processed time history to an analog form; and an output analog signal 140 representative of the measured voltage for further processing.

Figure 6:
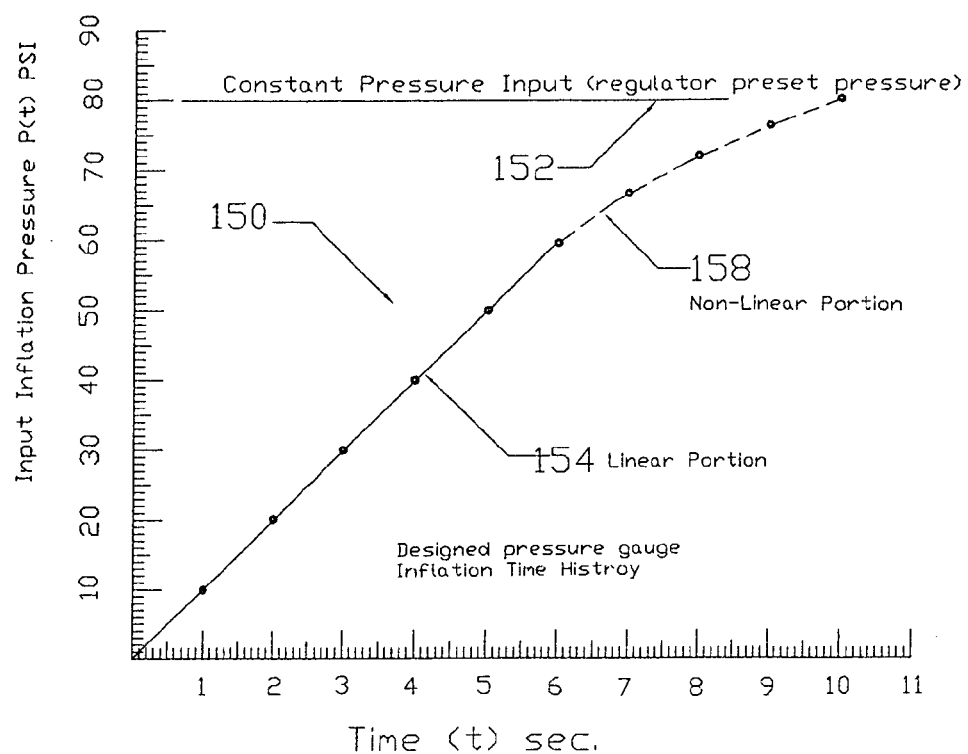
FIG. 6 is a graph depicting the gauge pressure inflation time history versus time.

FIG. 6 illustrates a typical pressure gauge calibration input inflation time history 150 for a constant pressure input 152 when the gauge is connected to a pressurization system comprising a pressure regulator 88 such as is disclosed in FIG. 4. The input inflation time history 150 comprises a linear portion 154 and a nonlinear portion 158. The nonlinear portion is caused by the closure of the pressure regulator 88 as the pressure within the gauge approaches the regulator's preset pressure. The input inflation time history nonlinear relationship will not effect the measurement. It is easily compensated for by dividing the signal sampling duration of time into more intervals. For example, if the gauge was designed to have a 1 psi accuracy then using 3 signal sampling time intervals for each 1 psi is sufficient to make the relationship between points piecewise linear throughout the non-linear portion 158.

Figure 7:
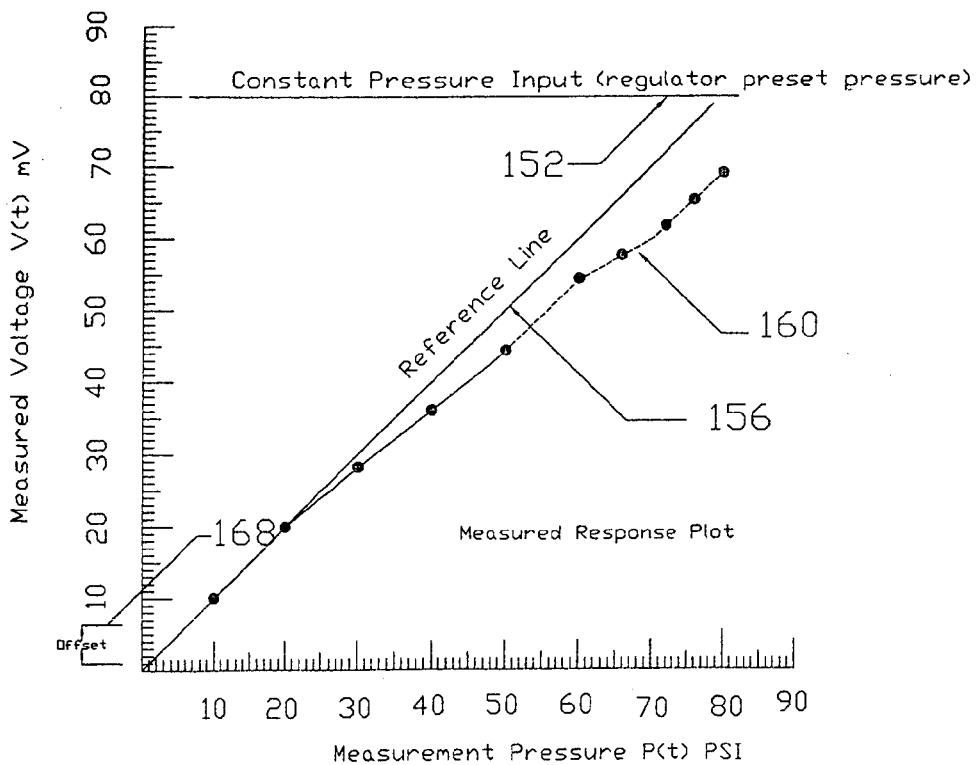
FIG. 7 is a graph depicting the gauge pressure inflation history and the measured voltage history.
Figure 8:
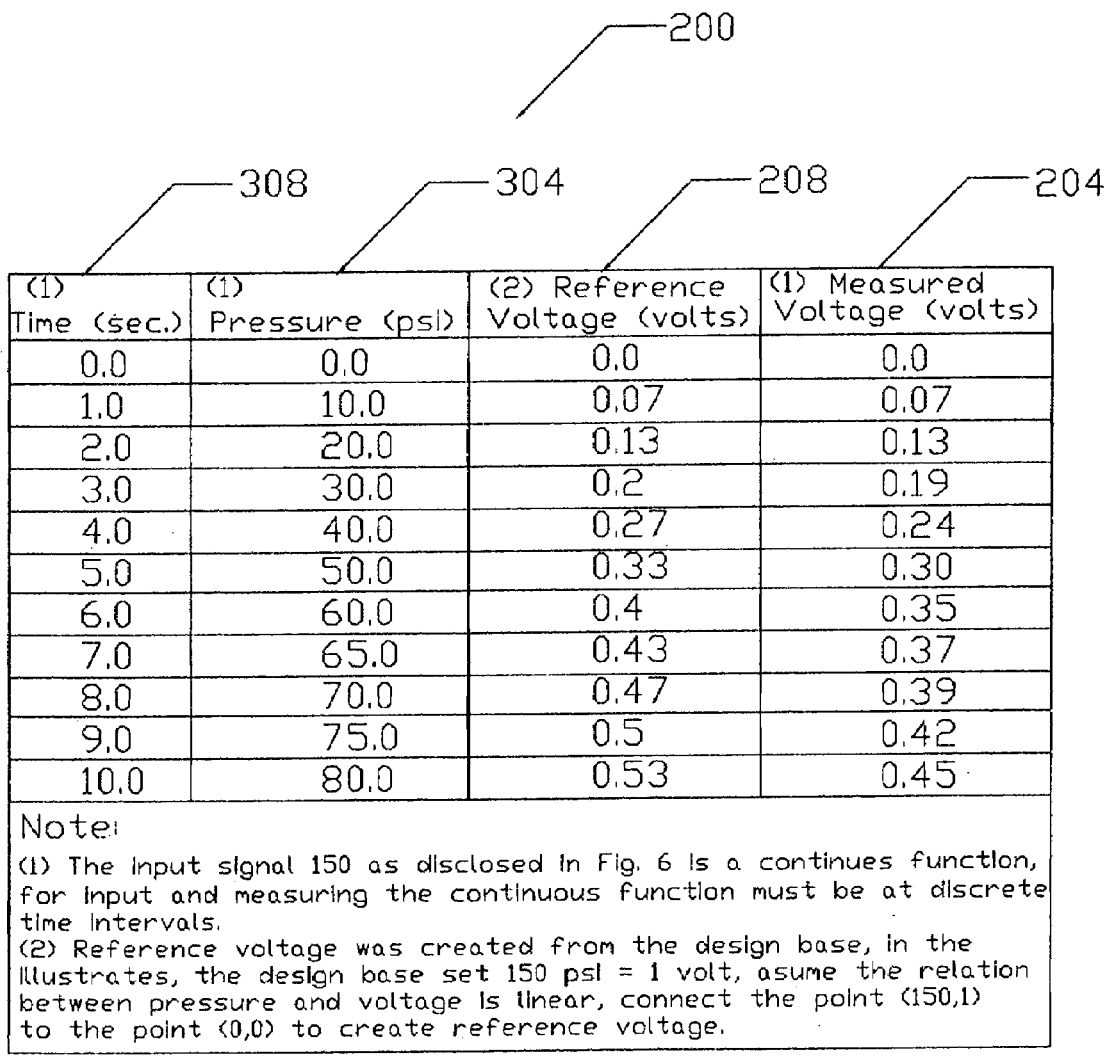
FIG. 8 is a table depicting an example of a lookup table database of the present invention.

FIG. 7 graphically demonstrates the calibration response process of the present invention, depicting the measuring of a voltage versus pressure inflation time history measured at discrete time intervals. In this example the expected operating range of the gauge 30 to be calibrated is chosen to be between 4 psi and 80 psi. The gauge 30 to be calibrated and a test gauge 92 are connected to a pressure source 80 through a pressure regulator 88, such as is depicted in FIG. 4. The gauge 30 to be calibrated and the test gauge 92 are subjected to a continuous, constant input pressure 152. The responses by both gauges to this continuous, constant input pressure are monitored and recorded at discrete time intervals. That is, at discrete time intervals the measured response voltage 160 from the gauge to be calibrated and the reference voltage 156 are sampled and stored in memory in the form of a look-up table, such as is depicted in FIG. 8. The sampling rate is chosen so as to eliminate the effects due to the non-linear response by the gauge to be calibrated. That is, the sampling rate is selected to eliminate the need for linear interpolation between data points when the calibrated gauge is used. The combined non-linear, span and random offset effects are reflected in the measured voltage 160 as compared to the reference voltage line 156. There is a low pressure system offset 168 due to the measurement device not being sensitive enough to respond to a very low pressure.

FIG. 8 depicts a lookup table database of the present invention that is stored in memory for use by the microprocessor in the error correction process of the present invention. By taking and storing the reference voltage, the lookup table database 200 has a series of measured voltages 204 and reference voltages 208, such that each row in the lookup table database 200 has two entries, the reference voltage and the measured voltage. The number of time intervals for the time history is dependent on the gauge accuracy specified, and the number of reference voltages in the table are set to have the same number of time intervals. The input signals are sampled at discrete time intervals to create a series of measured voltages over the pressure range of interest. The results then form the lookup table database and are stored into memory. The stored database is used at a later subsequent measurements to provide error correction. The lookup table database offers much more flexibility for compensation errors by replacing the measured voltage with the reference voltage at the same time interval and reduce the measured errors to near zero.

Referring now to FIG. 9, a block diagram of a further embodiment 250 of the present invention including a tire pressure measurement device within a tire valve stem cap 254 and including a radio frequency (RF) transmitter device 258 is illustrated. The system preferably includes a temperature and pressure sensor 258 that generates an electrical signal representative of the pressure upon the sensor. An operational amplifier 262 may be utilized with the pressure sensor to change the gain and signal conditioning for temperature compensation. The signal from the amplifier 262 is fed to an analog to digital converter 266 which then feeds a converted digital signal to the mircoprocessor 53. The microprocessor 53 is programmed to carry out control functions and compensation for errors such as are described in this specification, as well as data storage. An RF transmitter 268, that may include a direct covert transceiver 270 to direct modulation and demodulation of signal source intensity is used for transmitting tire pressure information. A low noise amplifier 274 is used to reduce the noise, and a power amplifier 278 is included for a better signal power. A matching circuit 282 regulates the signal intensity for the antenna 286 to transmit signals to a receiver (not shown).

Referring now to FIGS. 10 and 11, a low water absorption and high impact polycarbonate plastic cap 254 is desired to be affixed to a tire valve stem. The cross-section of FIG. 11 shows the valve stem cap is preferably made from two parts, the cap body 294 and cap mouth 298, and they are permanently integrated using ultrasonic welding after the completion of the assembly of the device. The components of the present invention are assembled within the cap, including an air check 302, a battery 306, a sensor 258, a microprocessor 53, an RF transmitter 268, and a printed circuit board (PCB) 310. The plastic cap body 294 preferably has hexagon shaped surfaces both inside and outside. The outer hexagon is used for an opening wrench to tighten the cap to the valve mouth, and the inner hexagon is to secure the PCB assembly from movement. The cap includes threads 314, which are the universal standard thread for the valve stem mouth. A plated metal cap top 320 that may be imbedded into the cap body 63 may be utilized to form the antenna 286 for the RF transmitter.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A calibration method for a digital air pressure gauge, comprising:

connecting the digital air pressure gauge and a reference pressure gauge to a source of pressurized air;

inputting the pressurized air at a constant pressure into the digital air pressure gauge and the reference pressure gauge;

obtaining a plurality of electrical signals at discrete time intervals from the reference gauge that are representative of reference values for said constant air pressure as said pressurized air is input into the reference gauge;

obtaining a plurality of electrical signals at said discrete time intervals from the digital air pressure gauge that are representative of measured values for said constant air pressure as said pressurized air is input into the digital pressure air pressure gauge; and generating a pressure calibration table for the digital air pressure gauge by storing said reference values and said measured values within a lookup table database.

2. A digital air pressure gauge, comprising:

a pressurized air inlet orifice;

a transducer for generating an electrical signal representative of air pressure within said gauge;

a lookup table database comprising measured air pressure values and reference air pressure values generated using the calibration method as in claim 1 and being stored within a database memory device within said gauge;

a microprocessor for comparing said generated electrical signal with said measured air pressure values, determining a closest measured air pressure value; and determining an associated reference air pressure value to said measured air pressure value; and a display device for displaying said reference air pressure value as the pressure of said pressurized air.

3. A digital gauge as described in claim 2, wherein said transducer includes a mechanical load cell and a linear potentiometer.

4. A digital gauge as described in claim 2, wherein said gauge is disposed within a low water absorption and high impact polycarbonate plastic cap, wherein said cap is formed with inner hexagonal shaped surfaces and outer hexagonal shaped surfaces.

5. A digital gauge as described in claim 2, wherein said gauge is disposed within a cylindrical housing.

6. A digital gauge as described in claim 5, wherein said display device is disposed within said cylindrical housing.

7. A digital gauge as described in claim 2, wherein said gauge further includes a transmitter for transmitting said reference air pressure values to a receiver.

8. A digital gauge as described in claim 7, wherein said display device is disposed within said receiver.

9. A digital gauge as described in claim 7, wherein said transmitter is an RF signal transmitter.

10. A digital gauge as described in claim 7, wherein said gauge is disposed within a tire valve cap.

* * * * *